UNITED STATES PATENT OFFICE.

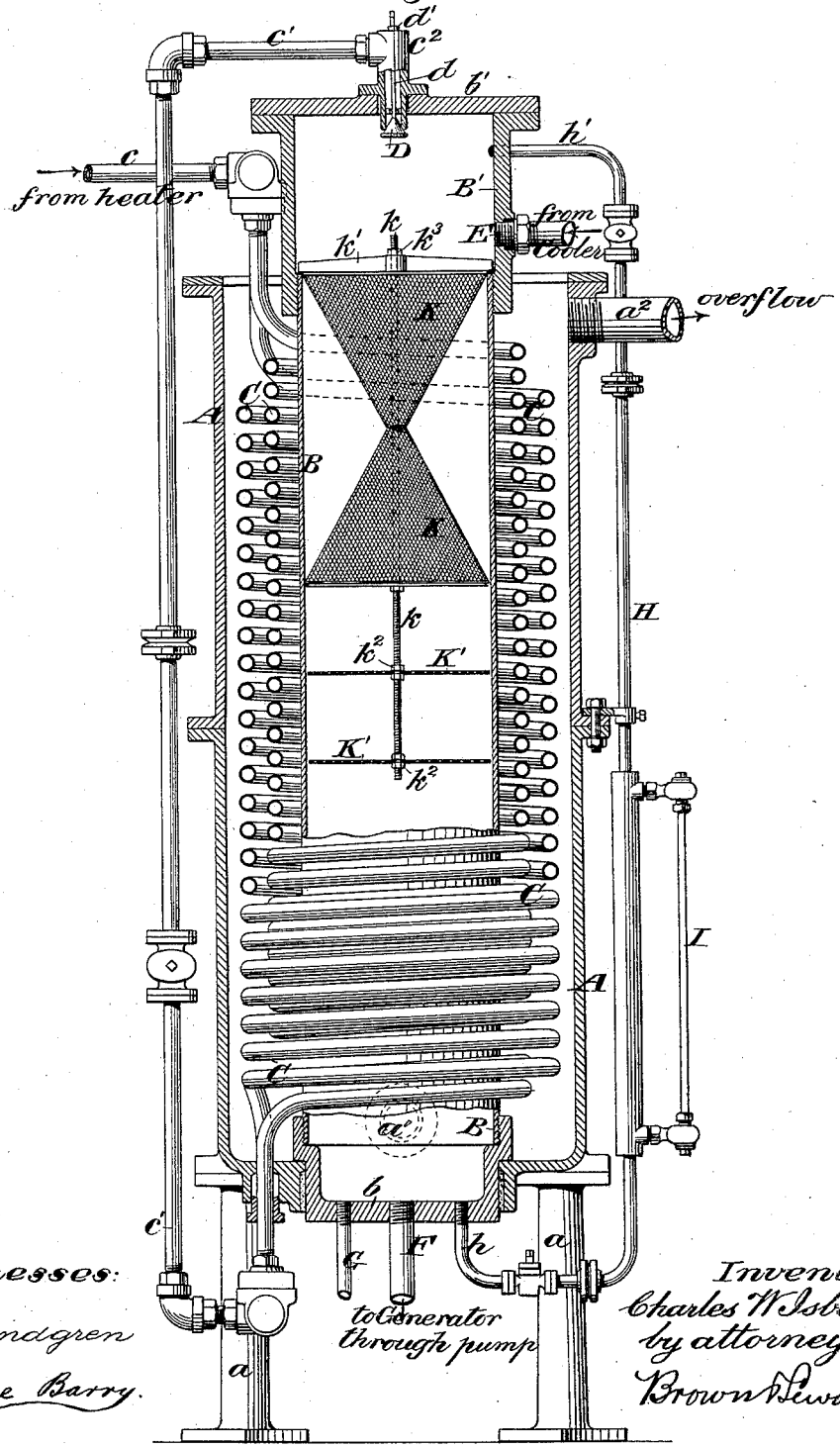

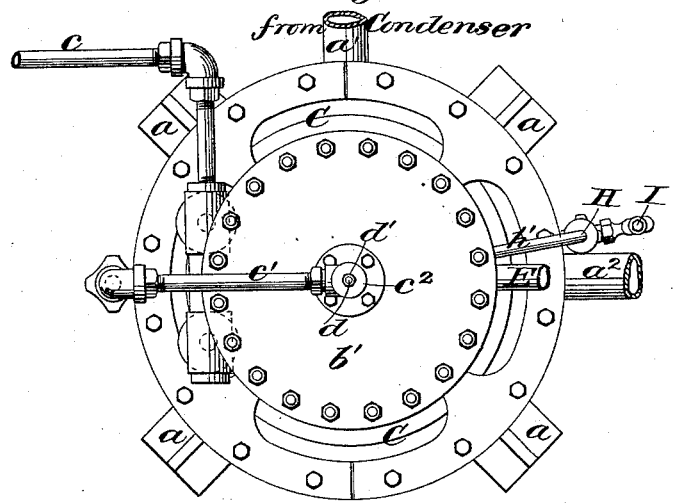
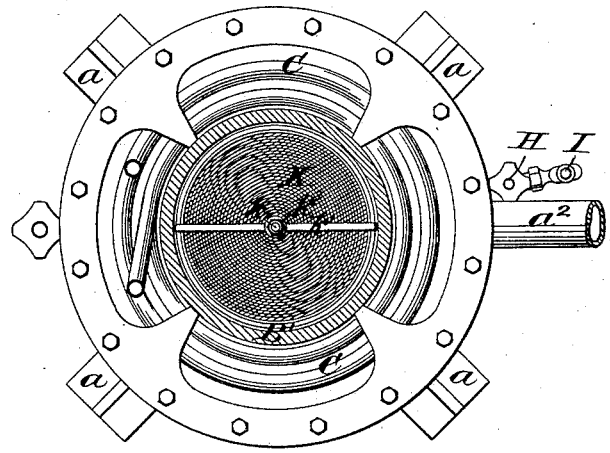
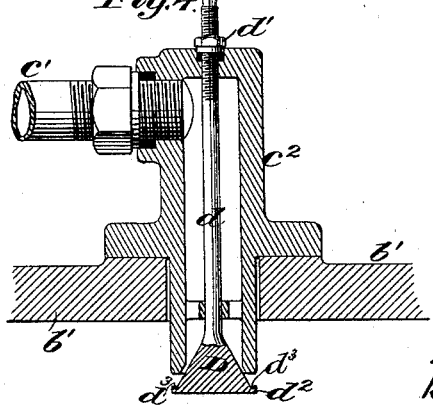

CHARLES W. ISBELL, OF NEW YORK, N. Y.

REFRIGERATING APPARATUS.

SPECIFICATION forming part of Letters Patent No. 469,477, dated February 23, 1892.

Application filed November 13, 1890. Serial No. 371,270. (No model.)

*To all whom it may concern:*

Be it known that I, CHARLES W. ISBELL, of the city and county of New York, in the State of New York, have invented a new and useful Improvement in Refrigerating Apparatus, of which the following is a specification.

My invention relates to an improvement in refrigerating apparatus in which a gas separated from an aqueous or other liquid solution and then condensed to a liquid condition is conducted into a position to abstract heat from a body to be cooled and the gas into which the liquid is converted during the cooling process is subsequently absorbed by an aqueous or other liquid and returned to the generator to be again separated.

The object is to provide for the use of water without regard to its purity or condition, to secure an increased cooling effect from the water employed, to provide against stoppages in the coils and the consequent loss in time and labor, to economize the fuel required to liberate the gas from solution, and in general to increase the power and efficiency of the absorber.

A practical embodiment of my invention is represented in the accompanying drawings, in which—

Figure 1 is a vertical sectional view of an absorber and the parts immediately connected therewith. Fig. 2 is a top plan view of the same. Fig. 3 is a top view with the cap removed to show the devices located within the absorbing-chamber, and Fig. 4 is an enlarged sectional view in detail of the regulating-valve and sprayer for the admission of the liquid into the absorbing-chamber.

My present invention has particular reference to improvements in the absorber and parts connected therewith, and is particularly well adapted to use in connection with the various other parts of a refrigerating apparatus—such, for example, as those shown and described in Letters Patent No. 423,133, granted to H. J. W. S. Cooke March 11, 1890.

A represents an outer vessel, preferably of circular or other curved form in cross-section, here shown as supported at its lower end upon pedestals $a$. The vessel A is provided with an inlet-pipe $a'$ at or near its lower end, through which the water is intended to pass into the vessel after it has done its work in connection with the condenser. (Not shown.) At or near the upper end of the vessel A there is provided an overflow-pipe $a^2$, through which the water which has done its work within the vessel A may pass either to waste or to further use, as may be desired.

Within the vessel A and spaced therefrom is an inner chamber B, preferably of the same shape in cross-section as the outer vessel A and supported at its lower end in a header $b$, making with the lower end of the outer vessel A a liquid-tight joint. The inner chamber B in the form here shown is provided with an extension B', projecting upwardly above the top of the outer vessel A and closed at its upper end by a suitable top or cover $b'$. Within the space between the outer vessel A and the inner chamber B pipe-coils C are located, extending continuously around the inner chamber from its upper to its lower portion and connected at the upper end with an inlet-pipe $c$, leading from the heater (not shown) and intended to conduct the liquor weak in gas which has been conducted from the generator and has accomplished its work in the heater. At the lower end the said pipe-coils C connect with an outlet-pipe $c'$, which conducts the liquor weak in gas upwardly to the top of the extension B' of the inner chamber, with which it communicates through a suitable connection $c^2$. The lower end of the connection $c^2$ within the chamber B' forms a valve-seat, and a conical valve D is located within the lower end of said connection and adapted to be adjusted toward and away from its seat, in the present instance by means of a screw-threaded stem $d$, which projects upwardly through the top of the connection $c^2$ and is there provided with an adjusting-nut $d'$. The lower end of the conical valve D is adapted to form a sprayer by which the liquid which escapes along down its sides between it and the valve-seat is caused to be arrested in its course and directed upwardly and outwardly in their direction from the vertical axis of the valve. To this end the lower end of said valve is provided with a rim $d^2$, between the upper edge of which and the face of the valve there is formed a V-shaped groove $d^3$.

A pipe E enters the inner chamber B B' at a point below the valve D and is intended to convey into the chamber gas from the cooler. An outlet-pipe F connects with the bottom of the said inner chamber B B', preferably through the header b, as shown, and is intended to convey the liquor strong in gas from the inner chamber to the generator. A blow-off pipe G also connects with the bottom of the inner chamber for the purpose of cleaning the chamber at pleasure of any sediment that may have accumulated therein.

For the purpose of determining the height of the liquid within the inner chamber a pipe H is provided, communicating at one end with the bottom of the chamber, as shown at $h$, and at the upper one with the upper end of the chamber, as shown at $h'$, the said pipe having fixed thereto and in communication therewith a gage I. The several pipes hereinbefore referred to are supplied with suitable cocks conveniently arranged for purposes of regulating or stopping and starting the flow of liquids therethrough. The said cocks may be of any ordinary structure and arranged as found convenient, and hence reference thereto in detail is not made.

Within the inner chamber, at a point below the entrance of the gas through the pipe E, there is located a separator consisting, as herein shown, of a double cone K, having the apexes of its sections united and presenting the bases of its sections up and down. It is intended that the bases of the sections of the double cone shall have diameters corresponding, substantially, to the diameters of a cross-section of the chamber and that they shall at their margins conform, substantially, to the inner wall of said inner chamber. The said double-cone separator is preferably formed of wire gauze or netting and serves to spread the liquid falling thereon into numerous small portions and to obstruct the downward fall of the liquid by interposing the walls of its meshes at short intervals, and finally distributes it from the lower end of the separator in proximity to the inner wall of the inner chamber. I have also shown in connection with the separator K additional separating devices consisting of horizontal sieves K', secured in vertical adjustment at their centers upon a supporting-rod $k$, depending from a cross-bar $k'$ or other suitable support at the top of the section B of the inner chamber. The vertical adjustment of the sieves or screens K' upon the supporting-rod $k$ is conveniently effected by providing the supporting-rod $k$ with an external screw-thread and the sieves or screens K' with nuts $k^2$ at their centers, adapted to engage the rod $k$. The rod $k$ may itself be made vertically adjustable, together with the screens thereon, by an adjusting-nut $k^3$, in connection with its upper end and bearing upon its support.

Instead of using the separator composed of one or more horizontal screens K' in connection with the separator K, it may be employed in the place of the separator K, or the separator K may be employed alone.

In operation a continuous flow of water takes place within the outer vessel A, entering through the inlet-pipe $a'$ and being discharged through the outlet-pipe $a^2$. As the water is not confined within pipe-coils, but, on the other hand, is allowed ample room for its passage through the vessel A, there is no need of purifying it or of selecting hard or soft water. Assuming that ammonia is the gas employed for cooling purposes, the liquid from the heater which has been drawn from the generator weak in ammoniacal gas enters the coils C through the inlet-pipe $c$, and passing downwardly through the said coils within the water in the vessel A becomes cooled thereby and is passed in its cool state from the bottom of the coils through the pipe $c'$ into the top of the absorbing-chamber B', through the connection $c^2$, and around the valve D. The sprayer or atomizer upon the valve D distributes the liquid laterally in every direction, and as it falls it comes in contact with and absorbs the ammoniacal gas injected into the chamber through the gas-inlet pipe E. As it passes down through the lower portion B of the absorbing-chamber its progress is interrupted by one or both of the separators, and it is thereby caused to take up still more of the gas. It is also, particularly when the separator K is employed, led downwardly toward the wall of the chamber B and brought into contact with the wall of the chamber B, kept cool by the surrounding water in the vessel A, and by such cooling made to take up a still greater amount of gas, until finally it is accumulated in the bottom of the chamber B as a liquid strong solution of ammonia. From thence it may be led through the outlet-pipe F to the generator to again have its gas separated therefrom for cooling purposes.

By providing for the cooling of every particle of the liquid in coils C and in falling through the absorbing-chamber and the consequent charging of same with a greater amount of the gas the separation of the gas therefrom in the generator is more readily accomplished, requiring less heat, and hence greatly economizing fuel.

What I claim is—

1. In a refrigerating apparatus, an absorber comprising a vessel adapted for the passage of a cooling-liquid therethrough, an absorbing-chamber located therein and spaced from the inner walls of the vessel, a conduit for the passage of the absorbing-liquid through the cooling-liquid between the vessel and the absorbing-chamber, means for conducting the absorbing-liquid from said conduit into the absorbing-chamber, means for introducing the gas into the absorbing-chamber, and a suitable discharge-pipe communicating with the absorbing-chamber, substantially as set forth.

2. In a refrigerating apparatus, an absorber comprising an outer vessel and means for maintaining a flow of cooling-liquid therethrough, an absorbing-chamber located within the said outer vessel and spaced therefrom, pipe-coils surrounding the absorbing-chamber within the outer vessel and provided at one end with a suitable inlet for conducting the absorbing-liquid thereto and at the opposite end with a pipe for conducting the liquid from the coils to the upper portion of the absorbing-chamber, a gas-inlet communicating with the absorbing-chamber at a point below that at which the absorbing-liquid enters the chamber, a separator located within the absorbing-chamber in position to separate the absorbing-liquid as it falls through the chamber, and a discharge-pipe leading from the bottom of the absorbing-chamber, substantially as set forth.

3. In a refrigerating apparatus, an absorber comprising an outer vessel and means for maintaining a flow of cooling-liquid therethrough, an absorbing-chamber located within the outer vessel and spaced therefrom, means for conveying the absorbing-liquid through the space between the absorbing-chamber and the inner wall of the outer vessel and conducting it to the upper portion of the absorbing-chamber, a sprayer or atomizer located in position to discharge the absorbing-liquid within the absorbing-chamber, a gas-conduit in communication with the absorbing-chamber at a point below the sprayer or atomizer, and means for withdrawing the charged liquid from the absorbing-chamber, substantially as set forth.

CHAS. W. ISBELL.

Witnesses:
FREDK. HAYNES,
K. E. PEMBLETON.